US007269763B2

(12) United States Patent
Maehara

(10) Patent No.: US 7,269,763 B2
(45) Date of Patent: Sep. 11, 2007

(54) IMAGE REPRODUCING APPARATUS WITH PROBLEM MONITORING/REPORTING ABILITY AND METHOD FOR MONITORING AND REPORTING PROBLEMS OCCURRING IN CONNECTION WITH IMAGE FORMING AND REPRODUCING PROCESS

(75) Inventor: Hidejirou Maehara, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 206 days.

(21) Appl. No.: 10/666,253

(22) Filed: Sep. 22, 2003

(65) Prior Publication Data

US 2004/0125393 A1 Jul. 1, 2004

(30) Foreign Application Priority Data

Sep. 20, 2002 (JP) ............................. 2002-274706
Sep. 10, 2003 (JP) ............................. 2003-318474

(51) Int. Cl.
*G06F 3/00* (2006.01)
*G06F 11/00* (2006.01)
*G06F 15/00* (2006.01)

(52) U.S. Cl. ...................... 714/48; 358/1.1; 358/1.15; 710/1; 710/15; 710/19; 714/100; 714/1; 714/57

(58) Field of Classification Search ................ 710/19, 710/15; 714/48; 400/74; 358/405
See application file for complete search history.

(56) References Cited

U.S. PATENT DOCUMENTS

| 4,669,899 | A | | 6/1987 | Kawakami et al. ...... 400/240.3 |
| 5,359,425 | A | | 10/1994 | Maehara et al. ............ 358/300 |
| 5,530,554 | A | | 6/1996 | Maehara ...................... 358/296 |
| 6,088,125 | A | * | 7/2000 | Okada et al. ............... 358/405 |
| 6,317,848 | B1 | * | 11/2001 | Sorens et al. ................. 714/48 |
| 6,622,266 | B1 | * | 9/2003 | Goddard et al. .............. 714/44 |
| 6,666,594 | B2 | * | 12/2003 | Parry ........................... 400/74 |
| 6,993,559 | B2 | * | 1/2006 | Jilk et al. .................... 709/206 |
| 2002/0116480 | A1 | * | 8/2002 | Muto .......................... 709/220 |
| 2002/0191210 | A1 | * | 12/2002 | Staas et al. ................ 358/1.15 |
| 2003/0016394 | A1 | * | 1/2003 | Shinomiya .................. 358/402 |
| 2003/0120775 | A1 | * | 6/2003 | York ........................... 709/224 |

FOREIGN PATENT DOCUMENTS

| JP | 6-320845 | 11/1994 |
| JP | 11-314439 | 11/1999 |
| JP | 2001-67247 | 3/2001 |
| JP | 2002-183864 | 6/2002 |
| JP | 2002-215484 | 8/2002 |

OTHER PUBLICATIONS

Microsoft Corporation; Microsoft Computer Dictionary; 2002; Microsoft Press; Fifth Edition; p. 352.*

* cited by examiner

*Primary Examiner*—Donald Sparks
*Assistant Examiner*—Richard B. Franklin
(74) *Attorney, Agent, or Firm*—Oblon, Spivak, McClelland, Maier & Neustadt, P.C.

(57) ABSTRACT

An image reproducing apparatus (1) comprises an image forming part (150, 160) that carries out an image forming and reproducing process; a data storage (20) that stores possible problems occurring in connection with the image forming and reproducing process, each problem being stored in association with addressee information; an acquiring unit (13) that acquires problem information when one of the problems occurs in connection with the image forming and reproducing process; an addressee determination unit (14) that selects an addressee corresponding to the occurring problem with reference to the data storage; and a communication unit (17) that reports the-occurring problem to the selected addressee.

22 Claims, 11 Drawing Sheets

FIG.3

| | 20a | 20b | 20c | 20d | 20e |
|---|---|---|---|---|---|
| | PROBLEM | ADDRESSEE | MESSAGE | PROBLEM ID CODE | RESTORATION MEASURES |
| | PAPER TRAY EMPTY | xxx@.○○ (User's E-mail Address) | There is no paper left in paper supply tray. | ER10 | Please supply paper and ··· |
| | PAPER JAM | | Paper jam has occurred. | ER11 | ··· |
| | ··· | | ··· | ··· | |
| | PRINT JOB UNEXECUTED | xxx@.○○○ (User's E-mail Address) x△x@○○○ (In-house System Administrator's E-mail Address) | Execution of print job was unsuccessful. | ER21 | Please clear the job and ··· |
| | ··· | | | ··· | ··· |
| | MALFUNCTION IN OPTICAL SYSTEM | △△△@.○○ (SC Maintenance Person's E-mail Address) | Optical system has problem in ··· | SC20 | Please power off and ··· |
| | MALFUNCTION IN PAPER-FEED MOTOR | | Paper-feed motor has problem in ··· | SC21 | |
| | ··· | | ··· | ··· | ··· |

FIG.4

| MACHINE ID | | |
|---|---|---|
| LOCATION (MAP DATA) | | |
| USER | NAME | |
| | E-MAIL ADDRESS | |
| | PASSWORD | |
| | APPARATUS NAME | |
| SYSTEM ADMINISTRATOR | NAME | |
| | EMAIL ADDRESS | |
| | PASSWORD | |
| | APPARATUS NAME | |
| SC MAINTENANCE PERSON | NAME | |
| | E-MAIL ADDRESS | |
| | PASSWORD | |
| | APPARATUS NAME | |
| ⋮ | | |

IMAGE REPRODUCING APPARATUS WITH PROBLEM MONITORING/REPORTING ABILITY AND METHOD FOR MONITORING AND REPORTING PROBLEMS OCCURRING IN CONNECTION WITH IMAGE FORMING AND REPRODUCING PROCESS

BACKGROUND OF THE INVENTION

1. Field of the Invention

The present invention generally relates to a digital image reproducing apparatus, and more particularly to an image reproducing apparatus with an ability to detect and report problems occurring in connection with an image forming and reproducing process.

2. Related Art

In a computer system comprising multiple computer terminals connected via a network to peripheral equipment, some problem generally occurs in the peripheral equipment shared among the computer terminals. In such a case, jobs requested by the computer terminals may not be executed. To deal with such inconvenience, a system for reporting the reason for the problem and the current memory contents at the time of occurrence of the problem to the computer terminals of is known. For example, JPA 2001-67247 discloses a technique for reporting occurrence of problem to the users by providing a Web page containing information about the problems having occurred in the peripheral equipment.

Meanwhile, a multi-function image reproducing machine furnished with different kinds of imaging functions, such as a photocopy function, a printer function, a facsimile function, and a scanner function, in one system is put to practical use under a computer network environment. When problem occurs in such a multi-function image reproducing machine, the essence of the problem has to be reported to the users and/or the service center to promptly restore operation of the machine from the problem.

However, in the above-described computer system disclosed in JPA 2001-67427, the user cannot learn of the information about the problem unless the user voluntarily accesses the Web page. The user has to check the Web page regularly to confirm whether the peripheral equipment is in good working order, which is troublesome.

In addition, with the above-described computer system, the reason for problem and the current memory contents of the peripheral equipment are provided to the user, and the peripheral equipment receives an instruction for restoring the interrupted process having been executing in the equipment from the user through the computer terminal. Unlike in the above-described computer system, different stages of problems occur in a multi-function image reproducing machine, some problems being corrected by user's action, and some requiring specialized maintenance and repairing techniques. To this end, with the multi-function type image reproducing machine, occurrence of problem has to be reported to an appropriate person depending on the degree of problem.

From these circumstances, a technique for reporting occurrence of problem and its essence to an appropriate person at appropriate timing when problem occurs in an image forming and reproducing process is desired.

SUMMARY OF THE INVENTION

The present invention was conceived in view of the above-described background, and it is an object of the present invention is to provide a technique for detecting and reporting a problem having occurred in connection with an image forming and reproducing process to an appropriate addressee at appropriate timing.

To achieve the object, in one aspect of the invention, an image reproducing apparatus with problem detecting and reporting ability is provided. The image reproducing apparatus comprises:

(a) an image forming part that carries out an image forming and reproducing process;

(b) a data storage that stores information about possible problems occurring in connection with the image forming and reproducing process, each problem being stored in association with addressee information;

(c) an acquiring unit that acquires problem information when one of the problems has occurred in the image forming and reproducing process;

(d) an addressee determination unit that selects an addressee corresponding to said one of the problems with reference to the data storage; and (e) a communication unit that reports occurrence of said one of the problems to the selected addressee.

The image forming and reproducing process includes a printing process for recording and outputting an image, and/or a reading process for optically reading an original. In this case, the image forming part includes a printing section that records and outputs the image, and/or a reading section that optically reads the original.

Preferably, the image reproducing apparatus further comprises a printing process management unit that monitors and detects printing problems occurring in connection with the printing process, and a reading process management unit that monitors and detects reading problems occurring in connection with the reading process. The acquiring unit acquires said one of the problems from the printing process management unit or the reading process management unit.

The image reproducing apparatus further comprises use information retaining means that retains use information about the image reproducing apparatus. In this case, the communication unit reports the occurrence of said one of the problems, together with the use information, to the selected addressee.

Use information contains location information representing the location of the image reproducing apparatus and/or ID information for identifying the image reproducing apparatus.

Preferably, the data storage stores one or more addressees as the addressee information, in association with said one of the problems.

For instance, at least one of addresses of the user of the image reproducing apparatus, the system administrator who conducts system administration for the image reproducing apparatus, and the maintenance person of the service center are stored in association with a single problem.

The image reproducing apparatus further comprises e-mail creating means that creates an e-mail to inform the addressee of the occurrence of a problem. In this case, the data storage stores an e-mail address as the addressee information, in association with the problem.

The data storage may store a problem ID code in association with one of the problems. The e-mail creating means inserts the problem ID code in the subject of the e-mail. This arrangement allows the addressee to promptly recognize what kind of problem has occurred, without opening the e-mail.

The image reproducing apparatus may further comprise Web page creating means, in addition to the E-mail creating means, which creates a Web page containing detailed information about the problem detected in the image reproducing apparatus. In this case, the E-mail creating means inserts the URL of the Web page in the subject of the e-mail. The addressee who received the e-mail can easily specify and access the Web page of the image reproducing apparatus to confirm the problem information.

In another aspect of the invention, a method for monitoring and reporting problem occurring in connection with an image forming and reproducing process is provided. The method comprises the steps of:
(a) storing possible problems occurring in connection with the image forming and reproducing process in advance, each problem being stored in association with addressee information;
(b) detecting a problem having occurred in connection with the image forming and reproducing process;
(c) determining an addressee to which the occurrence of problem is to be reported, from the addressee information stored in association with the detected problem; and
(d) reporting the detected problem to the determined addressee.

With the above described image reproducing apparatus and the problem monitoring and reporting method, the problem having occurred in connection with the image forming and reproducing process is promptly reported to an appropriate party at appropriate timing. A person who is reported of the occurrence of problem can promptly deal with the problem to restore operation of the image reproducing apparatus from the failure.

Since location information and/or the ID information of the image reproducing apparatus is supplied to one or more addressees, together with the problem information, earlier restoration of the image reproducing apparatus from the problem can be guaranteed.

BRIEF DESCRIPTION OF THE DRAWINGS

Other objects, features, and advantages of the present invention will become more apparent from the following detailed description when read in conjunction with the accompanying drawings, in which:

FIG. 3 is an example table of the data structure of the problem database 20, in which various types of problems likely to occur in connection with the image forming and reproducing process are stored in association with appropriate addressees;

FIG. 4 illustrates an example of data structure of use information retaining unit 22;

DETAILED DESCRIPTION OF THE INVENTION

The preferred embodiments of the present invention are next described with reference to the attached drawings.

Figure 1:
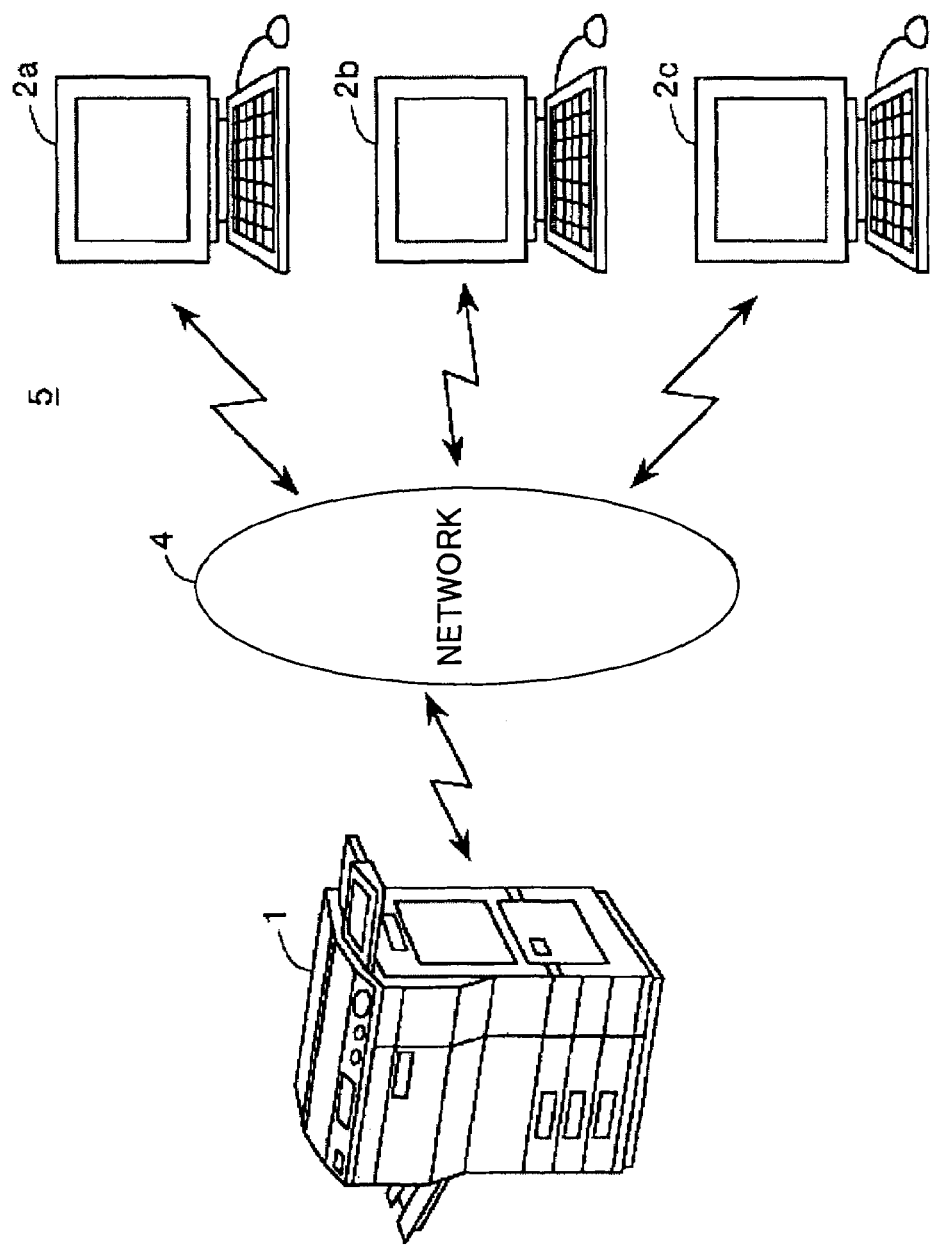
FIG. 1 illustrates an overall view of the system to which the present invention is applied, the system including an image reproducing apparatus 1 having a problem monitoring and reporting function.

FIG. 1 schematically illustrates the problem monitoring and reporting system 5, which includes an image reproducing apparatus 1 and multiple terminal devices 2a-2c connected via the network 4 to the image reproducing apparatus 1.

The image reproducing apparatus 1 monitors, problems occurring in the image reproducing apparatus 1 itself, in connection with an image forming and reproducing process. When any problem occurs, the image reproducing apparatus reports the occurrence of problem to at least one of the terminal devices 2a through 2c, selecting one or more appropriate addressees to which the problem is to be reported.

In the example shown in FIG. 1, the image reproducing apparatus 1 is a multi-function composite machine that is furnished with different types of digital image reproducing functions, such as a photocopy function, a printer function, a facsimile function, and a scanner function. The image reproducing apparatus 1 also functions as a Web server connected to the network 4.

The terminal devices 2a, 2b and 2c transmit and receive information over the network 4 to and from the image reproducing apparatus 1. For example, terminal device 2a belongs to the user of the image reproducing apparatus 1. The user transmits a print command to the image reproducing apparatus 1 through the terminal device 2a and the network 4 to cause the image reproducing apparatus 1 to execute a desired print job. The terminal device 2a can receive necessary information from the image reproducing apparatus 1 via the network 4.

The terminal device 2b belongs to, for example, a local-area system administrator (such as an in-house system administrator or a floor administrator). The terminal device 2c belongs to a maintenance person from the service center (which may be referred to as a "SC person in charge"), in charge of maintenance and repair of the image reproducing apparatus 1.

The image reproducing apparatus 1 contains a problem monitoring and reporting part to detect a problem occurring in connection with the image forming and reproducing operations and report the problem to the necessary parties.

Figure 2:
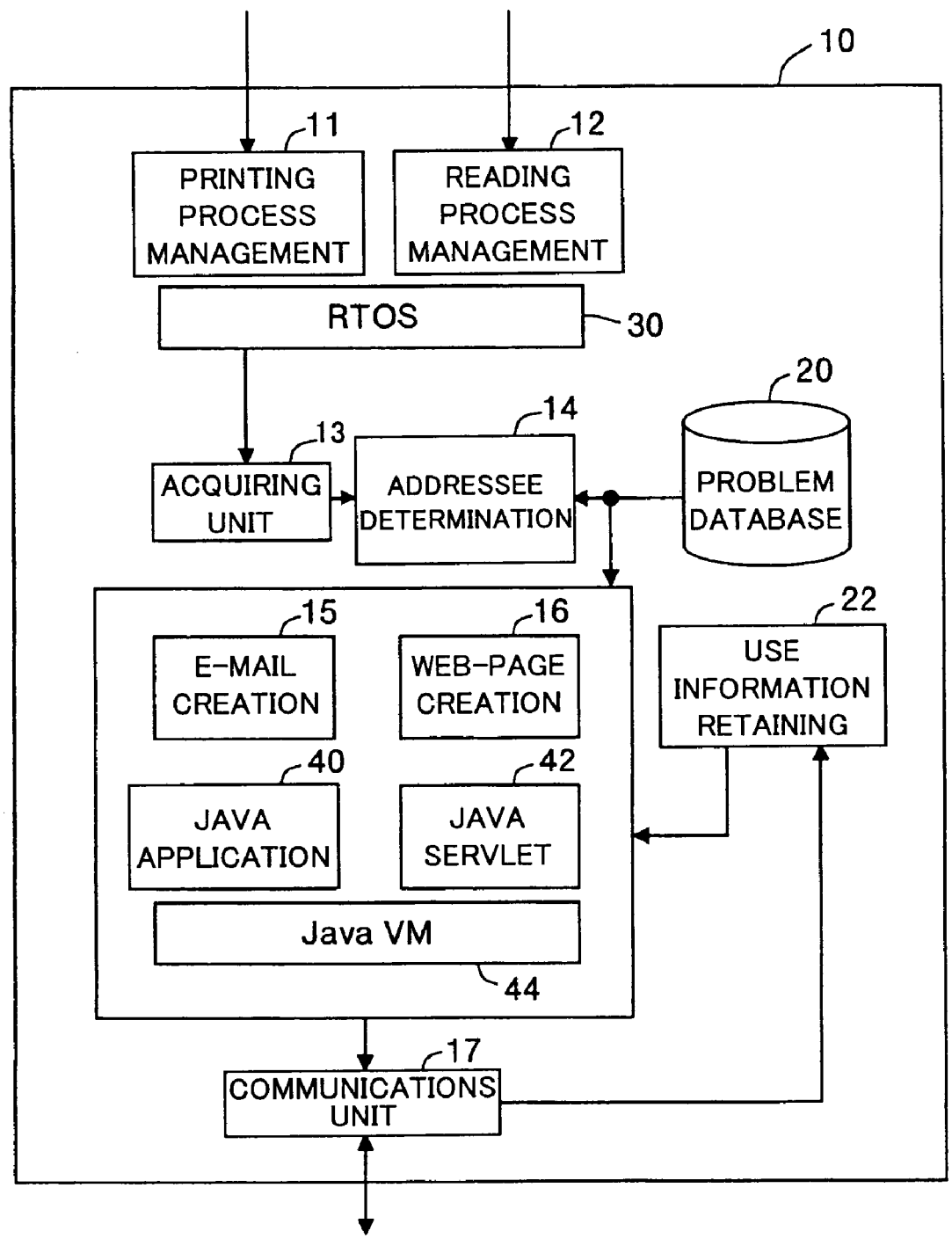
FIG. 2 is a block diagram of the problem monitoring part 10 of the image reproducing apparatus 1 shown in FIG. 1.

FIG. 2 is a block diagram of the problem monitoring and reporting part 10 of the image reproducing apparatus 1. The problem monitoring and reporting part 10 comprises a printing process management unit 11, a reading process management unit 12, and RTOS (Real Time Operation System) 30 for operating the process management units 11 and 12. The RTOS 30 is an operating system implemented with a function of executing real-time operations. Accordingly, the RTOS 30 estimates necessary processing time, and causes multiple job requests to be completed within a target period of time when such multiple job requests are generated simultaneously.

The problem monitoring and reporting part 10 also has an e-mail creating unit 15, and a Web page creating unit 16. To allow the e-mail creating unit 15 and the Web page creating unit 16 to execute necessary processes, Java (registered trademark of Sun Microsystems Inc.) virtual machine (Java-VM) 44, a Java® application 40, and JAVA® servlet 42 are furnished.

Java®-VM is software that converts Java® byte code to native code of the platform, such as Windows® or MacOS®, loaded on the apparatus to implement operations. To be more precise, Java®-VM 44 executes the Java® application 40, while converting the Java® byte code into the format (i.e., the native code) peculiar to the platform, to allow the operations of the e-mail creating unit 15 to be carried out. Similarly, Java®-VM 44 executes the Java® servlet 42 to allow the operations of the Web page creating unit 16 to be carried out.

The problem monitoring and reporting part 10 also has an acquiring unit 13, an addressee determination unit 14, and a communications unit 17 in communication with the terminal devices 2a through 2c via the network 4, as well as problem database (DB) 20 and use information retaining unit 22.

The printing process management unit 11 manages the process in the printing section 150 (see FIG. 10) of the image reproducing apparatus 1. Accordingly, printing process management unit 11 monitors problem occurring in connection with the printing operations, which is a part of the image forming and reproducing process of the image reproducing apparatus 1. The printing operations include writing of pixel data onto the photosensitive drum (see FIG. 10), reproduction (or transfer) of the image onto paper, transport of paper, and ejection of the printed paper. These operations are described in more detail below.

The reading process management unit 12 manages the process in the reading section 160 (see FIG. 10) of the image reproducing apparatus 1. Accordingly, reading process management unit 12 monitors problem occurring in connection with the reading operations, which is also a part of the image forming and reproducing process of the image reproducing apparatus 1. The reading operations include optically reading the original and feeding paper to the reading position.

When problem has occurred in the image reproducing apparatus 1, the acquiring unit 13 acquires information about what kind of problem has occurred. When the printing process management unit 11 detects problem in connection the printing process, the acquiring unit 13 receives the problem information from the printing process management unit 11. When the reading process management unit 12 detects problem in connection with the reading process, the acquiring unit 13 receives the problem information from the reading process management unit 12.

The addressee determination unit 14 consults the problem database 20 to determine to which party (or parties) the occurrence of problem is to be reported, in accordance with the problem information acquired by the acquiring unit 13.

The problem database 20 stores possible problems that are likely to occur in the image reproducing apparatus 1, each problem being stored in association with one or more addressees. The use information retaining unit 22 retains information regarding use of the image reproducing apparatus 1, such as location information and the ID information of the image reproducing apparatus 1. The detailed data structures of the problem database 20 and the use information retaining unit 22 are described below.

The Web page creating unit 16 makes use of information stored in the problem database 20 and the use information retaining unit 22 to create a HTML document for a Web page that contains the contents to be reported to the addressee through the communications unit 17.

The e-mail creating unit 15 also makes use of information stored in the problem database 20 and the use information retaining unit 22 to create an e-mail that contains the contents to be reported to the addressee through the communications unit 17. The e-mail creating unit 15 inserts the e-mail address of the addressee selected by the addressee determination unit 14 in the destination of the created e-mail.

The communications unit 17 functions as data transmission means, and it transmits the e-mail via the network 4 to the e-mail address of the addressee determined by the addressee determination unit 14. When any of the terminal devices 2a-2c belonging to the user, the local-area system administrator, or the maintenance person of the service center (SC) accesses the Web page of the image reproducing apparatus 1 via the network 4, the communications unit 17 transmits the Web page created by the Web page creating unit 16.

In this manner, problem is detected by the printing process management unit 11 and the reading process management unit 12 that monitor the image forming part of the image reproducing apparatus 1, and supplied to the acquiring unit 13. The addressee determination unit 14 determines the appropriate addressee to whom the detected problem is to be reported. The problem monitoring part 10 is configured to create an e-mail and/or a Web page, insert the detected problem information upon detecting the problem, and transmit the e-mail and/or the Web page to report the problem to the appropriate addressee. Consequently, occurrence of problem can be reported to the appropriate addressee(s) at appropriate timing. Even if the design of the image reproducing apparatus 1 is altered, it is unnecessary to change the design of the problem monitoring part 10.

FIG. 3 illustrates an example of the data structure of the problem database 20 shown in FIG. 2. In this example, the problem database 10 has a problem field 20a, an addressee field 20b, a message field 20c, a problem ID code field 20d, and a restoration measures field 20e.

The problem field 20a stores various problem names acquired by the acquiring unit 13 from the printing process management unit 11 and the reading process management unit 12. Although, in the example shown in FIG. 3, only a few of the problems detected by the printing process management unit 11 are listed, all the possible problems likely to be detected by the reading process management unit 12 are also listed in the problem field 20a.

The addressee field 20b stores addressee information in association with each of the problems, based on which the detected problem item is to be reported. Although, in the example shown in FIG. 3, one or more e-mail addresses are stored as the addressee information in association with each problem, other information, such as the IP address of the terminal device or the telephone number of the person (or the party) to be reported of the occurrence of problem, may be stored in addition to the e-mail addresses.

If the problem is concerning a simple error, such as "paper-tray empty" or "paper jam", that can be corrected by the user of the image reproducing apparatus 1, the addressee is set to the user himself/herself. Accordingly, the occurrence of such a simple problem is reported to the terminal device 2a of the user. Upon receiving the message from the image reproducing apparatus 1 through e-mail and/or the Web page, the user can fix the problem by supplying paper to or removing the jammed paper from the image reproducing apparatus 1.

Although not shown in the example shown in FIG. 3, a problem message may be transmitted to the user's terminal device 2a when the image reproducing apparatus 1 is busy due to a massive number of jobs requested by another user.

Moreover, even if the detected problem is a simple error corrected by the user, the occurrence of problem may also be reported to the local-area (in-house or floor) system administrator or the maintenance person of the service center (SC). In this case, one or more addressees stored in the addressee field 20b in association with the problem name are referred to.

If the problem is directed to job management or memory management, such as failure of execution of a print job, then the e-mail addresses of the local-area system administrator and the user are stored in the addressee field 20b in association with the problem name. In this case, the e-mail is transmitted to the terminal devices 2a and 2b of the user and the system administrator, respectively. The user can clear the job or transmit a command for forcibly executing the job via the terminal device 2a. If problem has occurred in the memory (not shown), the system administrator restores and corrects the memory to restart the job.

Although not shown in the example of FIG. 3, if there are two or more local-area system administrators in charge of the image reproducing apparatus 1, the e-mail addresses of these system administrators may be stored in association with a single problem.

If the problem requires technical knowledge for the recovery, the addressee field 20b stores the e-mail address of the maintenance person from the SC in charge of the image reproducing apparatus 1. Such problems requiring a special technique for restoration include a malfunction of the optical system or the paper-feed motor. The state in which such hard problems have occurred is referred to as a "service call state".

Since problem database 20 stores one or more addressees in association with each of the possible problems, the addressee determination unit 14 consults the problem database 10 to determine the appropriate addressee, to which the occurrence of the problem is to be reported, in accordance with the contents of problem information, upon acquiring the detected problem at the acquiring unit 13.

The message field 20c of the problem database 20 stores a message, in association with each of the problems, which is to be transmitted when reporting the addressee of the occurrence of the problem. The messages stored in the message field 20c of the problem database 20 are utilized mainly by the e-mail creating unit 15 and the Web page creating unit 16. The e-mail creating unit 15 creates an e-mail, inserting the message corresponding to the detected problem. The Web page creating unit 16 creates a Web page, inserting the message corresponding to the detected problem.

The problem ID code field 20d of the problem database 20 stores ID codes of the respective problem names. For instance, problems fixable by the user or the local-area system administrator are denoted as ER10 or ER20, representing an error in the image forming and reproducing process. On the other hand, problems that require repair and maintenance service by the service center (SC) are denoted as SC20 or SC 21.

The problem ID code is inserted in the "subject" of the e-mail when the e-mail creating unit 16 creates an e-mail. The person or the party who receives the e-mail can immediately recognize the type of the problem having occurred in the image reproducing apparatus 1, even without opening the e-mail. Especially, if the terminal devices 2a, 2b and 2c are furnished with a function of displaying arrival of e-mails on the monitor screen, the addressee of the e-mail can immediately learn of the occurrence of problem and the type of problem, without accessing the Web page of the image reproducing apparatus 1.

The restoration measures field 20e of the problem database 20 stores information representing restoration measures for each of the problems. The information representing the restoration measures for fixing the problem is used by the e-mail creating unit 15 and the Web page creating unit 16 to produce an e-mail and update the Web page, respectively.

FIG. 4 illustrates an example of the data structure of the use information retaining unit 22. In the example shown in FIG. 4, the use information retaining unit 22 retains ID information (e.g., a machine ID) for identifying the image reproducing apparatus 1, together with location information representing the location of the image reproducing apparatus 1, user information, system administrator information, and SC information about the maintenance person from the service center.

The location information includes, for example, the address of the building in which the image reproducing apparatus 1 is installed, the floor information, and image data of map information or the URL of a Web page containing the map information indicating the location of the image reproducing apparatus 1.

The user information includes the user's name, the e-mail address, the password registered in the image reproducing apparatus 1, and the name of the image reproducing apparatus 1 as named by the user. The system administrator information includes the system administrator's name, the e-mail address, the registered password, and the name of the image reproducing apparatus 1 as named by the system administrator. The SC information includes the name of the maintenance person, the e-mail address, the registered password, and the name of the image reproducing apparatus as named by the service center.

The user information may further include a short or two-digit code for obtaining permission for using the image reproducing apparatus 1. Similarly, the system administrator information and the SC information may include the short codes.

The machine ID shown in the example of FIG. 4 is a unique ID code of the image reproducing apparatus 1 maintained in the problem monitoring system 5 (see FIG. 1). On the contrary, the name of the image reproducing apparatus 1 is relative ID information (nickname) of the image reproducing apparatus 1 effective only for the user, the system administrator, or the SC.

Since the use information retaining unit 22 retains location information and addressee's information, the e-mail creating unit 15 and the Web page creating unit 16 refer to the use information retaining unit 22, as well as to the problem database 20, when creating an e-mail and updating the Web page, respectively.

Information stored in the use information retaining unit 22 may be obtained from the user, the system administrator, and the service center via the network 4 and the communications unit 17. Alternatively, the information may be input directly to the image reproducing apparatus 1 using a user interface (not shown) provided in the image reproducing apparatus 1. The location information may be obtained as file data by causing the scanner 106 (see FIG. 10) of the image reproducing apparatus 1 to read the original illustrating the current location. It is desirable to obtain the location information as a GIF file, for example.

Information retained in the use information unit 22 may be registered when setting up the image reproducing apparatus 1. The information retained in the use information unit 22 may be changed after the installation by instruction from the user, the system administrator, or the service center.

Figure 5:
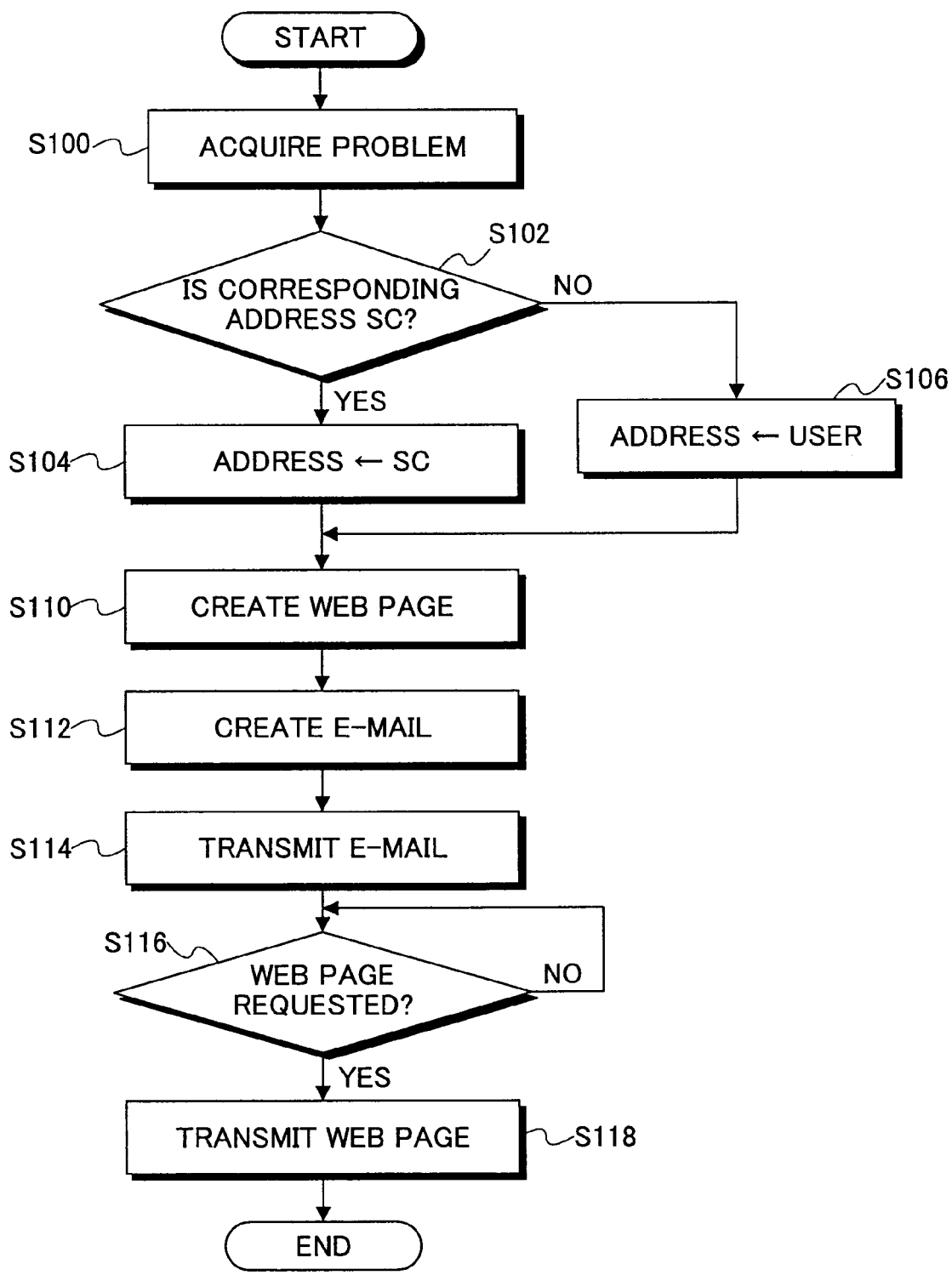
FIG. 5 is a flowchart showing the operations carried out by the problem monitoring part 10.

FIG. 5 is a flow chart showing the operations carried out by the problem monitoring part 10 of the image reproducing apparatus 1. For simplifying the explanation, it is assumed that the problem database 20 stores at least the address of one of the user and the SC maintenance person in the addressee field 20b.

When the printing process management unit 11 or the reading process management unit 12 detects a problem in the image reproducing apparatus 1, the acquiring unit 13 acquires the detected problem from he printing process management unit 11 or the reading unit management unit 12 (step S100). The addressee determination unit 14 refers to the problem database 20 to select the addressee stored in association with the detected problem. If the SC maintenance person is recorded in association with the detected problem in the problem database 20 (YES in step S102), the addressee determination unit selects the e-mail address of the SC maintenance person as the addressee to which the occurrence of problem is to be reported (step S104). If the user is recoded in association with the detected problem (NO in S102), the addressee determination unit 14 selects the e-mail address of the user as the addressee (step S106).

Although not shown in the operation flow of FIG. 5, one or more addressees may be determined among the user, the in-house or floor system administrator, and the SC maintenance person.

Then, the Web page creating unit 16 reads the message, the restoration measures, and other necessary information, which are recorded in association with the detected problem, from the problem data database 20 to create a Web page containing these information items (step S110).

On the other hand, the e-mail creating unit 15 creates an e-mail, using the e-mail address selected by the addressee determination unit 14, to which the occurrence of problem is to be reported (step S112). The creation of the Web page in step S110 and the creation of the e-mail in step S112 may be carried out simultaneously.

The communications unit 17 transmits the e-mail created by the e-mail creating unit 15 to the selected addressee via the network 4 (step S114). In this manner, upon the occurrence of problem, the problem monitoring part 10 transmits the e-mail containing the problem information to the appropriate addressee, the user or the SC maintenance person who receives the e-mail can promptly recognize the occurrence of problem.

When the user or the SC maintenance person clicks the URL contained in the e-mail to access the Web page of the image reproducing apparatus 1 (YES in step S116), the communications unit 17 transmits the Web page created by the Web page creating unit 16 to the requester (step S118). Then, the process terminates.

The user, the SC maintenance person, and the system administrator can access the Web page at any time to check the current state of the image reproducing apparatus 1, even if no e-mail is transmitted from the image reproducing apparatus 1. When there is an access to the Web page, the communications unit 17 transmits the updated Web page to the accessing terminal device 2. Since the Web page contains the restoration measures read from the problem database 20, as well as the location information and the apparatus name read from the use information retaining unit 22, the person who has accessed the Web page can learn of the detailed information about the problem. The Web page may contain the past record of the problems having occurred in the image reproducing apparatus 1.

Figure 6A:
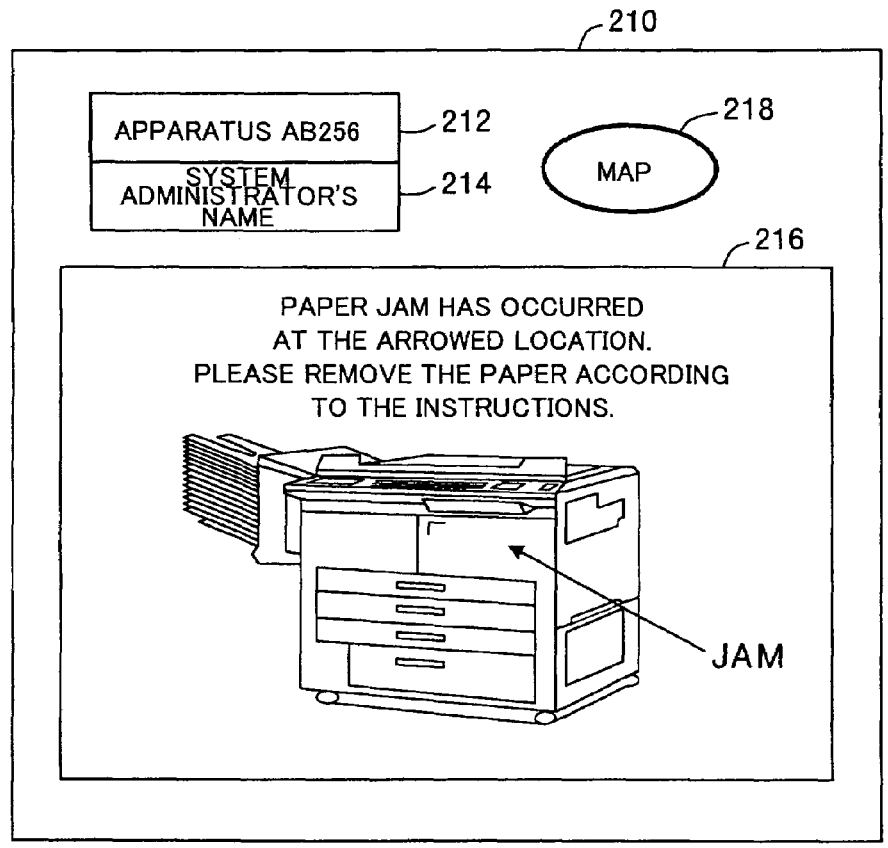
FIGS. 6A and 6B are examples of Web pages created by the Web page creating unit 16.
Figure 6B:
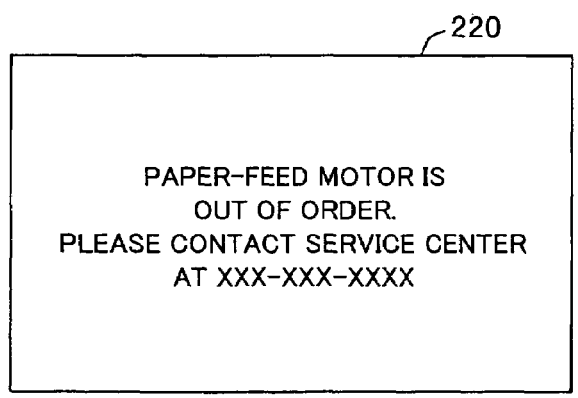

FIG. 6A and FIG. 6B illustrate examples of the Web page created by the Web page creating unit 16 in step S110 of the, flowchart shown in FIG. 5. Web page 210 shown in FIG. 6A is created when a paper jam is detected at a certain spot in the image reproducing apparatus 1. Web page 220 shown in FIG. 6B is created when a malfunction of the paper-feed motor is detected in the image reproducing apparatus 1.

In FIG. 6A, the Web page creating unit 16 inserts the apparatus name (for example, AB256) given by the user in the apparatus box 212 when the paper jam is detected, assuming that the probability of access from the user himself/herself is highest. By clicking the apparatus box 212, the apparatus name can be switched to other names given by the system administrator and the SC maintenance person because they can access the Web page under the prescribed passwords. The machine ID (including the manufacturer's number) uniquely assigned to the image reproducing apparatus 1 may also be displayed in the apparatus name box 212.

In the name box 214, the name of the system administrator is inserted. When the user cannot deal with the paper jam, and when the user clicks the name box 214, the extension number or the e-mail address of the system administrator is displayed. The name of the SC maintenance person in charge of the image reproducing apparatus may also be inserted in the name box 214.

Message box 216 displays a general perspective view of the image reproducing apparatus, indicating the location of paper jam, together with the message "Paper jam has occurred at the arrowed location. Please remove paper in accordance with instructions".

Map button 218 links to a Web page showing a map. By clicking the map button 218, a map showing the location of the building in which the image reproducing apparatus is installed or a floor sketch is displayed. The person who accesses the Web page 2.10 can visually identify the machine in problem and its location by clicking the map button 218.

Figure 7:
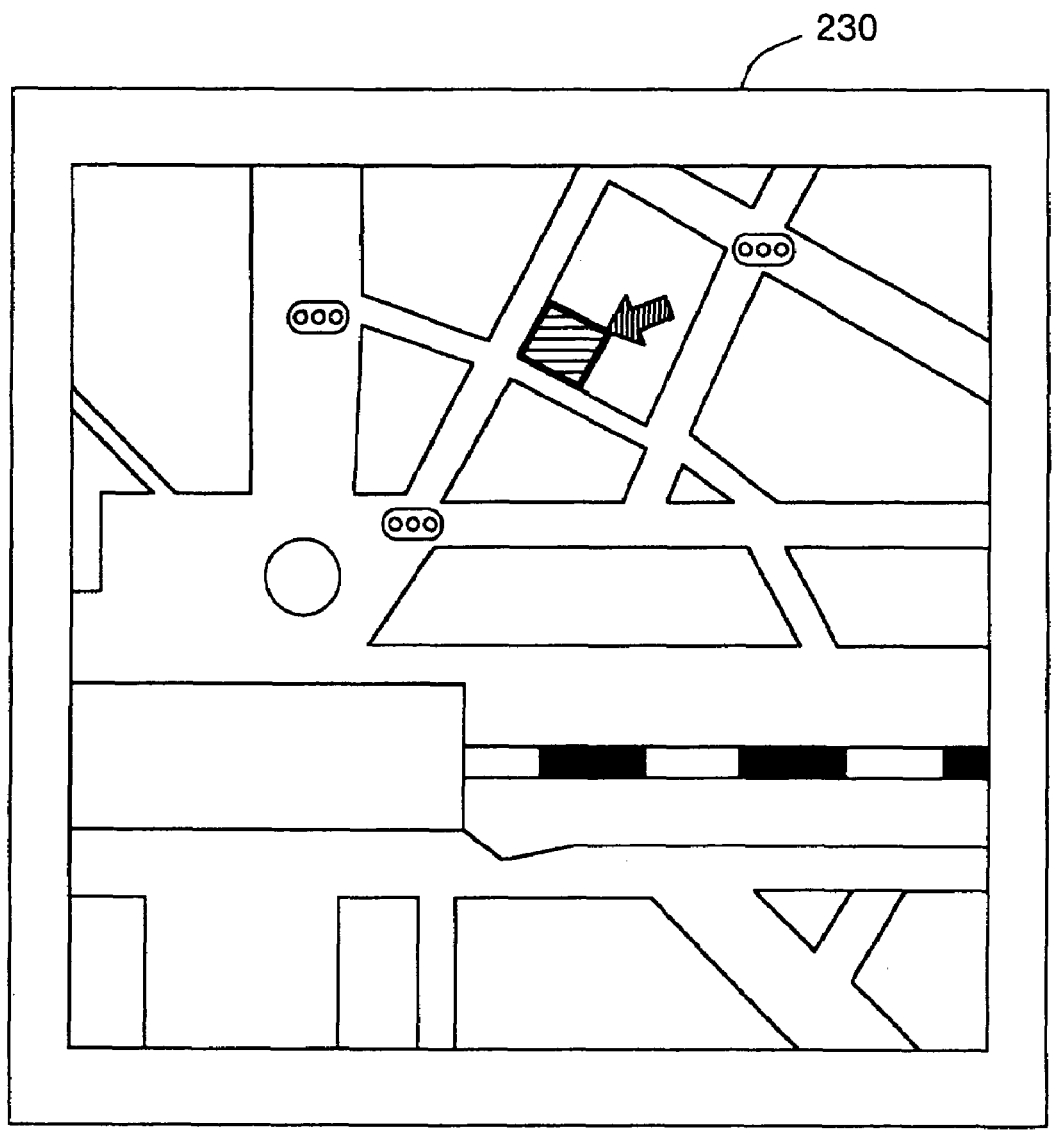
FIG. 7 illustrates an example of the map page linked with the Web page.

FIG. 7 illustrates an example of the Web page linked with the map button 218 to offer the map. In Web page 230, the location of the building in which the image reproducing apparatus 1 is installed is indicated by the pointer. If the building indicated by the pointer is clicked on, the map window may be switched to the floor map indicating the location of the image reproducing apparatus.

Such map information is useful for the in-house (or floor) system administrator and the SC maintenance person because they can know the exact location of the image reproducing apparatus 1 when they are requested to check and repair the image reproducing apparatus 1.

The map information may be further linked with the navigation system of the SC maintenance person. For instance, by acquiring the code number of the target building from the Web page 230 and inputting the code number into the navigation system, the SC maintenance person can reach the target building quickly, without loosing the way to the building. By switching the map window of the Web page 230, the SC maintenance person can visually confirm the location of the image reproducing apparatus inside the building.

The Web page creating unit 16 may create the Web pages shown in FIG. 6A and FIG. 6B by inserting the information stored in the problem database 20 and the use information retaining unit 22 in a prescribed model format of HTML document.

Returning to FIG. 6B, an example of Web page 220 reporting a malfunction of the paper-feed motor is illustrated. Malfunction of the paper-feed motor is a type of problem that cannot be dealt with by the user and is to be reported to the SC maintenance person. Accordingly, when the malfunction of the paper-feed motor is detected, e-mail is transmitted to the SC service man from the problem monitoring part 10 of the image reproducing apparatus 1. However, since the e-mail may not reach the SC maintenance person for some reason, such as network failure, the Web page creating unit 16 creates the Web page 220 shown in FIG. 6B, together with a Web page 210 showing, for example, the image of the interior structure of the image reproducing apparatus 1. The Web page 220 contains a message to the user, such as "Please contact the service center at telephone number XXX-XXX-XXXX." Accordingly, when the user becomes aware of the abnormal operation of the image reproducing apparatus 1 and accesses the Web page, the user can learn of the current state of the image reproducing apparatus 1, and can directly contact the appropriate person.

Figure 8:
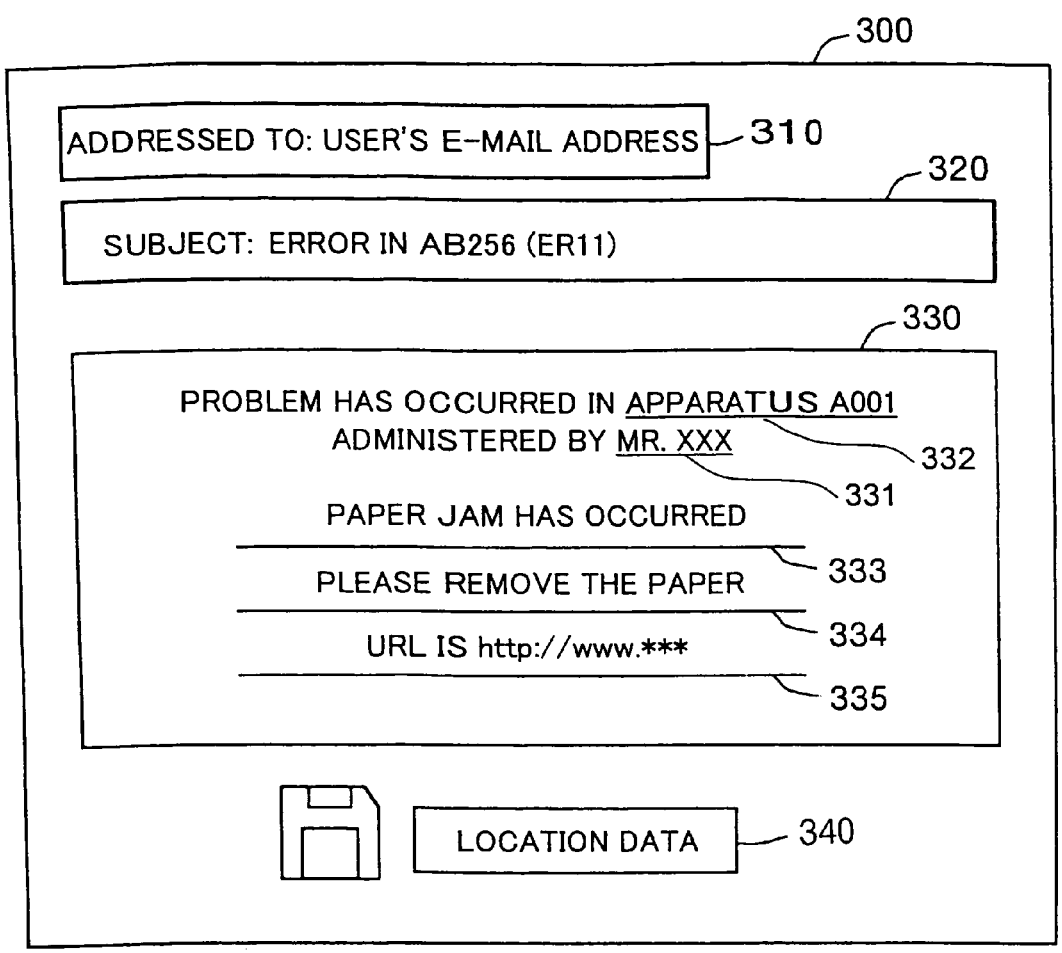
FIG. 8 is an example of the e-mail created by the e-mail creating unit 15.

FIG. 8 illustrates an example of e-mail 300 created by the e-mail creating unit 15. The e-mail creating unit 15 inserts the e-mail address selected by the addressee determination unit 14 in the destination 310. In the example shown in FIG. 8, the user's e-mail address is inserted to report the user of the occurrence of a paper jam. The e-mail creating unit 15 also inserts the problem code (for example, ER11), stored in the problem data base 20 in association with the problem name acquired by the acquiring unit 13, into the subject 320 of the e-mail.

The apparatus name of the image reproducing apparatus 1 given by the user and the name of the system administrator are inserted in sections 331 and 332, respectively, in the message box 330. Actual problem information and the restoration measures to be taken are inserted in sections 333 and 334, respectively. For example, messages "Paper jam has occurred" and "Please remove the paper" are inserted in sections 333 and 334, respectively. In addition, the URL (e.g., "http://www****") of the Web page created by the Web page creating unit 16 is inserted in section 335. Inserting the URL of the Web page in the e-mail allows the user to easily access the Web page by simply clicking on the URL. The user can learn the detailed information about the problem.

The location information of the image reproducing apparatus 1 is provided as an attached file. When the location data box 340 is clicked on, the location information, containing map information, can be opened.

Figure 9:
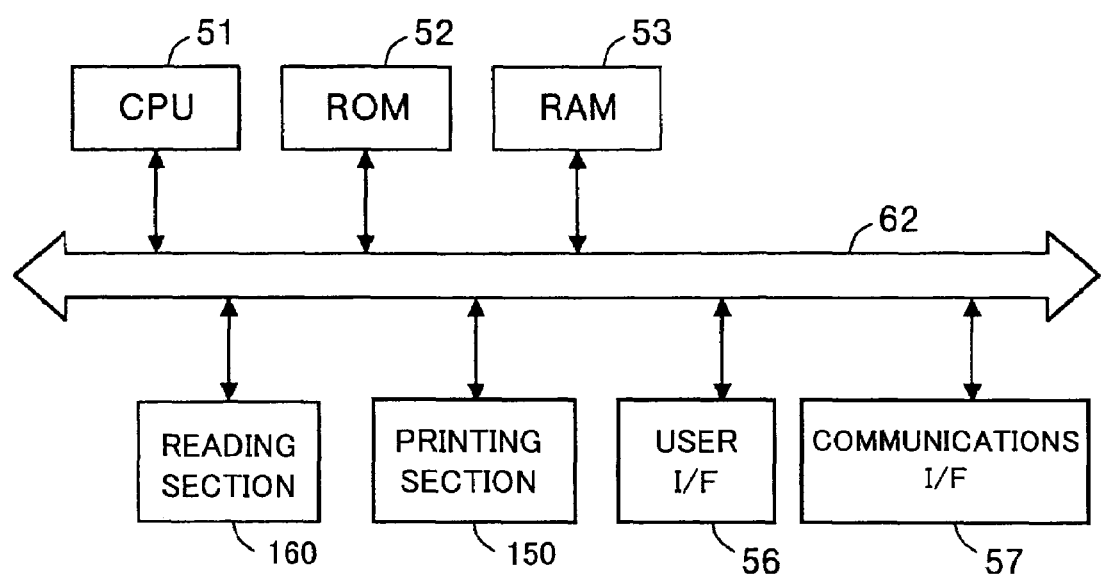
FIG. 9 is a block diagram of the hardware structure of the image reproducing apparatus 1.

FIG. 9 illustrates the hardware structure of the image reproducing apparatus 1. The ROM 52 stores the basic program for image processing, as well as a problem monitoring program executed by the problem monitoring part 10. The CPU 51 controls each component of the image reproducing apparatus 1 in accordance with the programs stored in the ROM 52, and executes the image forming and reproducing process and the problem monitoring process. The RAM 53 includes a work area, and stores various data required for the control of the image reproducing apparatus 1. The image reproducing apparatus 1 further has a reading section 160 that optically reads originals, a printing section 150 that reproduces and prints the pixel data read from the original or received via the network, a user interface (I/F) 56 that receives user's manipulations and transmits information to the user, and a communications I/F 57 that connects the image reproducing apparatus to the network. These components are connected to each other via the bus 62.

The problem monitoring program may be recorded in an installable or executable file format in a computer-readable storage medium, such as a CD-ROM, a floppy-disk (registered trademark of IBM), or DVD.

Alternatively, the problem monitoring program may be stored in a server connected to the network, including the Internet, and downloaded to the image reproducing apparatus 1 via the network.

If the problem monitoring program is provided while being stored in a recording medium, the image reproducing apparatus 1 reads the problem monitoring program from the recording medium. The problem monitoring program is then loaded in the primary memory of the image reproducing apparatus 1, and the respective functions illustrated in FIG. 2 are held in the primary memory for execution.

Figure 10:
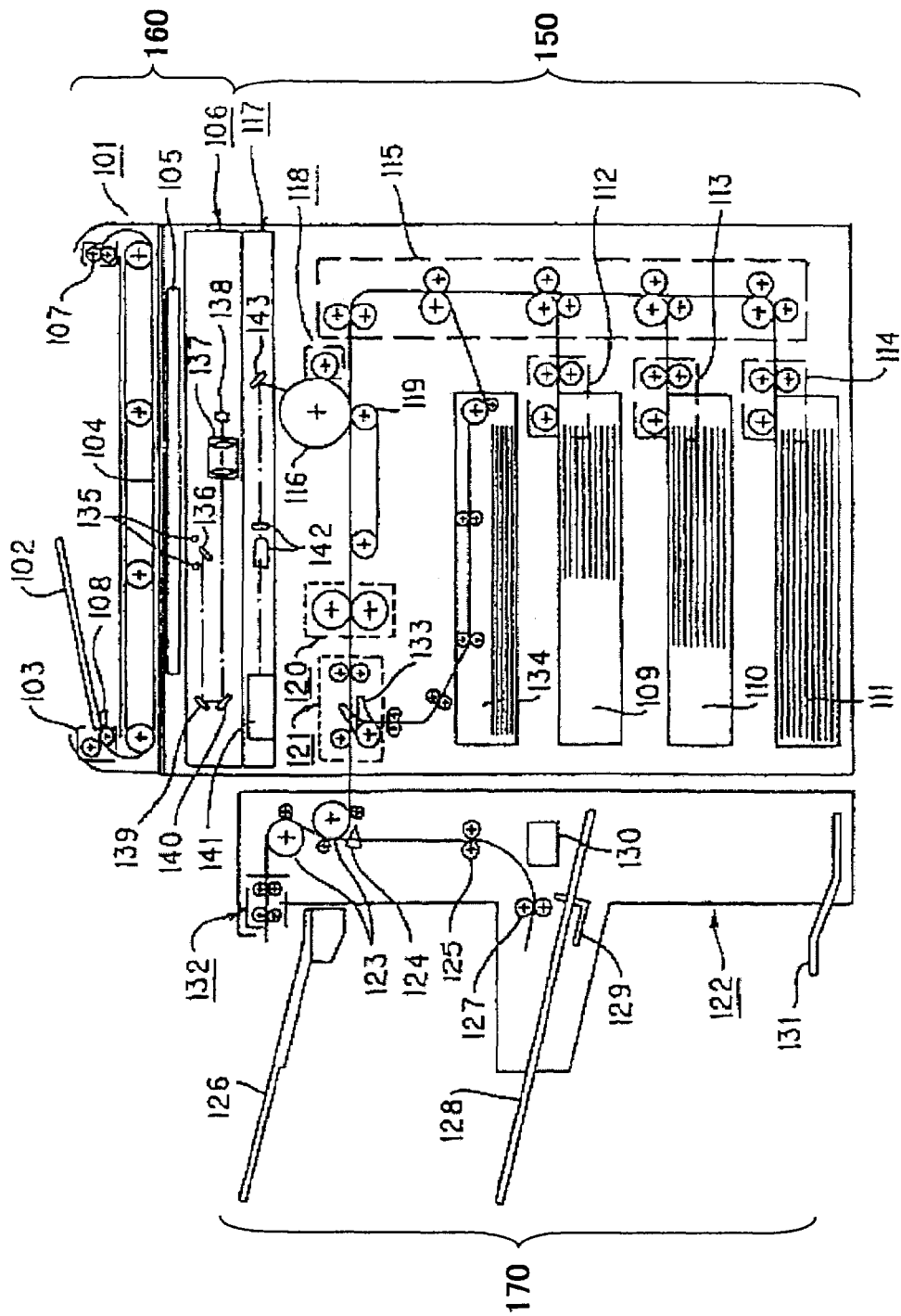
FIG. 10 is an overall cross-sectional view showing the mechanical structure of the image reproducing apparatus 1.
Figure 11:
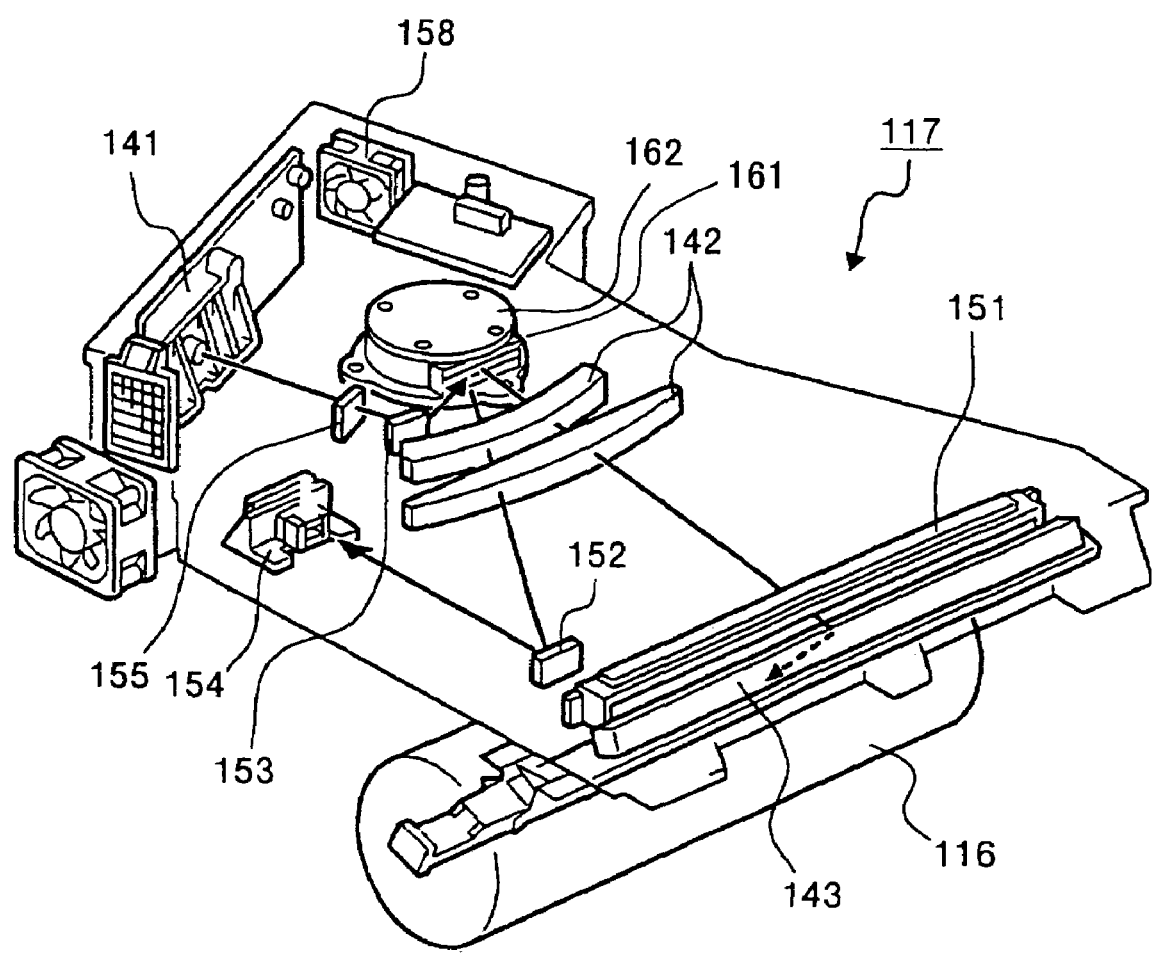
FIG. 11 is a perspective view of the mechanical structure of the optical writing unit 117 of the printing section 150.

FIG. 10 schematically illustrates the mechanical structure of the image reproducing apparatus 1. FIG. 11 illustrates the structure of the optical writing unit 117 of the printing section 150.

The image reproducing apparatus 1 includes a reading section 160 that optically reads the original to acquire pixel data, and a printing section 150 that reproduces and prints the pixel data read from the original or received from an external device. The reading section 160 and the printing section 150 form an image forming part.

In the reading section 160, if the document sensor 108 senses the presence of the original placed on the tray 102 of the automatic document feeder (ADF) 101 then the original is fed to a prescribed position on the contact glass 105 by the feed roller 103 and the feed belt 104. The optical scanner 106 optically reads the image from the original placed on the contact glass 105. The scanned original is removed from the contact glass 105 by the feed belt 104 and the ejection roller 107. The feed roller 103, the feed belt 104 and the ejection roller 107 are driven by a motor (not shown).

The scanner 106 comprises the contact glass 105 for supporting the original, and an optical scanning system. The optical scanning system comprises an exposure lamp 135, a first mirror 136, a lens, 137, a CCD image sensor 138, and other components. The exposure lamp 135 and the first mirror 136 are fixed onto the first carriage (not shown), while the second mirror 139 and the third mirror 140 are fixed onto the second carriage (not shown). When optically reading the original image, the first carriage and the second carriage are mechanically moved at the relative rate of 2 to 1, so as to maintain the optical path length constant. The optical scanning system is driven by a scanner driving motor (not shown).

The image formed on the original is read by the CCD image sensor 138. The optically detected signals are converted to electric signals (analog pixel signals), which are then further converted to digital pixel data. The digital pixel data are subjected to various types of image processing operations. The magnification of the image is varied by moving the positions of the lens 137 and the CCD image sensor 138 along the optical axis (that is, to the left or the right on the paper). Accordingly, in response to the magnification designated by the user, the horizontal position of the lens 137 and the CCD image sensor 138 are determined.

If there is any problem occurring in the reading section 160, the reading process management unit 12 of the problem monitoring part 10 of the image reproducing apparatus 1 detects such a problem, and supplies the detected problem to the acquiring unit 13.

In the printing section 150, paper accommodated in the first paper-supply tray 109, the second paper-supply tray 110, or the third paper-supply tray 111 is transported by the vertical transportation unit 115 to the prescribed position at which the paper comes into contact with the photosensitive drum 116. The pixel data read by the reading section 160 or received from an external device are written onto the photosensitive drum 116 using the scanning laser beam emitted and deflected by the optical writing unit 117. As the photosensitive drum 116 rotates and passes the developing unit 118, a toner image is formed on the surface of the photosensitive drum 116. The toner image formed on the photosensitive drum 116 is transferred onto the recording paper having been transported by the transport belt 119 that moves at the same linear rate as the linear rate of the surface of the rotating photosensitive drum 116. The fixing unit 120 fixes the image transferred onto the recording paper. The paper having been subjected to the fixing process is ejected from the paper ejection unit 121 to the finisher 122.

The post-processing finisher 122 guides the recording paper, which bears the printed image and was ejected from the paper ejection unit 121, toward either the regular ejection roller 132 or the stapling tray 128. The paper feed paths toward the ejection roller 132 and the stapling tray 128 are switched by the switching plate 124. If the switching plate 124 is positioned upward, the recording paper is guided to the regular ejection tray 126 through the transport roller 123. If the switching plate 124 is positioned downward, then the recording paper passes through the transport rollers 125 and 127, and is guided to the staple tray 128.

Each time recording paper is ejected onto the staple tray 128, the stacked sheets of paper are jogged by the jogger 129 so that the paper edges align with each other. When the printing job is finished, a set of paper sheets is stapled by the stapler 130. The stapled set of paper sheets falls onto the stapled set ejection tray 131, due to its own weight.

The regular ejection tray 126 is movable back and forth. The regular ejection tray 126 changes its ejected paper receiving position for each sheet of original, or each set of printed sheets sorted by the image memory (not shown), so as to sort the ejected paper in a simple manner.

To make a duplex copy, the branching lever 133 for switching the paper feed path is set upward. In this state, the recording paper supplied from the first tray 109, the second tray 110, or the third tray 111 and subjected to image formation on one side of the paper is guided to the duplex preparation tray 134, without being fed to the ejection tray 126.

Then, the paper bearing an image on one side (front) is taken out of the duplex preparation tray 134, and guided again to the photosensitive drum 116. The toner image formed on the photosensitive drum 116 is transferred onto the other side (back) of the paper. The branching lever 133 is switched downward so as to guide the paper having the images on both sides toward the ejection tray 126. The duplex preparation tray 134 is used to transfer toner images onto both sides of the paper.

The photosensitive drum 116, the transport belt 119, the fixing unit 120, the paper ejection unit 121, and the developing unit 118 are driven by the main motor (not shown). The driving force of the driving motor is transmitted to the first paper feed device 112, the second paper feed device 113, and the third paper feed device 114 through the associated paper feed clutches (not shown). The vertical transportation unit 115 is also driven by transmission of the driving force of the main motor to the vertical transportation unit 115 through an intermediate clutch (not shown).

FIG. 11 illustrates the mechanical structure of the optical writing unit 117 of the printing section 150. The optical writing unit 117 has an air-tight casing, in which various optical components and control devices are arranged in the prescribed optical-positional relation.

The optical writing unit 117 includes an LD unit 141, a cylinder lens 155, a first mirror 153, a polygon mirror 161, a polygon motor 162 for rotating the polygon mirror 161, a focusing lens 142, a BTL lens 151, a mirror 143, and other components as an optical scanning system. The laser beam emitted from the LD unit 141 is deflected by and reflected from the high-speed polygon mirror 161 that rotates at a prescribed rate, and passes through the focusing lens 142. The laser beam is further reflected from the mirror 143, and focuses onto the scanned surface of the photosensitive drum 116.

To be more precise, the laser beam emitted from the LD unit 141, which is the light source of the optical writing unit 117, is caused by the polygon mirror 161 to scan in the fast scan (main scan) direction, that is, in the direction perpendicular to the rotational direction of the photosensitive drum 116, while illuminating predetermined spots on the photosensitive drum 116 to write pixel signals output from the selector of an arbitrary image processor (not shown) for each line. The line scanning in the fast scan direction is repeated at a prescribed interval corresponding to the rotational speed and the recording density of the photosensitive drum 116, and an electrostatic latent image is formed on the surface of the photosensitive drum 116.

A synchronization detecting sensor 154 is arranged in the vicinity of the photosensitive drum 116 at one end of its cylindrical body. The laser beam deflected by and reflected from the polygon mirror 161 and having passed through the focusing lens 142 is reflected by the mirror 152, and guided to the synchronization detecting sensor 154. The synchronization detecting sensor 154 generates a fast scan synchronization signal.

Based on the fast scan synchronization signal, the synchronization detecting sensor 154 further generates a timing signal for controlling the writing start timing of the pixel signals in the main scan direction, as well as a control signal for controlling input and output of the pixel signals.

If there is any problem occurring in the printing section 150 including the optical writing unit 117, the printing process management unit 11 of the problem monitoring part 10 of the image reproducing apparatus 1 detects the problem, and supplies the detected problem to the acquiring unit 13.

Although the present invention has been described using specific examples, the present invention is not limited to these examples, but includes various modifications and substitutions thereof that are obvious to a person of an ordinary skill in the art.

For example, in the above-described embodiment, the printing process management unit 11 and the reading process management unit 12 detect problems having occurred in the printing section 150 and the reading section 160, and merely supply the detected problems to the acquiring unit 13. However, the printing process management unit 11 and the reading process management unit 12 may acquire the restoration measures to fix the detected problems from the printing section 150 and the reading section 160, respectively. In this case, it is unnecessary for the problem database 20 to store the restoration measures. Instead, the printing section 150 and the reading section 160 have tables recording the restoration measures in association with each of the possible problems.

Although, in the embodiment, the problem monitoring part 10 of the image reproducing apparatus 1 monitors problems occurring in the printing section 150 and the reading section 160, other problems likely to occur in other sections of the image reproducing apparatus 1 may be monitored and detected. For example, the problem monitoring part 10 may includes another management unit for monitoring and detecting problems occurring in data transmission or the memory, or problems occurring in the ejection and post-processing section 170.

In the above-described embodiment, the problem monitoring and reporting technique is applied to an image reproducing apparatus of a multi-function composite type, in which problems occurring in connection with the image forming and reproducing process, such as digital photocopy, a printing operation, or facsimile output, are monitored and reported to appropriate persons. However, the problem monitoring technique of the present invention is applicable to an arbitrary imaging process, other than the digital photocopy or printing process.

For example, the present invention is suitably applied to monitoring and reporting problems occurring in tomography used for diagnosis of the human body or inspection of crystal defects. In this case, the image forming and reproducing process includes X-ray imaging, and image reproduction on a monitor display. The occurrence of problem is reported to an appropriate person (or party), such as an inspection technician or the manufacturer of the apparatus, depending on the type and the extent of the detected problem.

Although, in the embodiment, the problem monitoring part is built in to the image reproducing apparatus 1, the problem monitoring part may be configured as a separate apparatus. In this case, the problem monitoring apparatus detects and acquires problem information from the image reproducing apparatus through a network or a connection cable (e.g., a USB cable). The rest of the structure and the operations of such a separate type problem monitoring apparatus are the same as those of the problem monitoring part 10 of the image reproducing apparatus 1.

In conclusion, with the image reproducing apparatus and the problem monitoring method of the present invention, problem having occurred in connection with image forming and reproducing process can be reported to an appropriate person or party at appropriate timing. Accordingly, the person or the party reported of the occurrence of problem can promptly and correctly deal with the problem so as to return the image reproducing apparatus to normal operation.

This patent application is based on and claims the benefit of the earlier filing dates of Japanese Patent Application Nos. 2002-274706 filed Sep. 20, 2002, and 2003-318474 filed Sep. 10, 2003, the entire contents of which are hereby incorporated by reference.

The invention claimed is:

1. An image reproducing apparatus comprising:
   an image forming part that carries out an image forming and reproducing process;
   a data storage that stores a plurality of possible problems occurring in connection with the image forming and reproducing process, each problem being stored in association with a problem ID code and addressee information selected based on a severity of the problem;
   an acquiring unit that acquires problem information when one of the problems occurs in connection with the image forming and reproducing process;
   an addressee determination unit that selects an addressee corresponding to said one of the problems with reference to the data storage;
   a communication unit that reports occurrence of said one of the problems to the selected addressee;
   a web page creating means that creates a Web page containing detailed information about the problems detected in an image reporting and reproducing process and a user customizable designation corresponding to the image reproducing apparatus; and
   an e-mail creating means that creates an e-mail to report the occurrence of said one of the problems to the selected addressee and inserts the problem ID code, the user customizable designation and a URL of the Web page in a subject field of the e-mail.

2. The image reproducing apparatus according to claim 1, wherein the forming and reproducing process includes at least one of a printing process for recording and outputting an image and a reading process for optically reading an original, and the image forming part includes at least one of a printing section that records and outputs the image, and a reading section that optically reads the original.

3. The image reproducing apparatus according to claim 2, further comprising a printing process management unit that monitors and detects printing problems occurring in connection with the printing process, and a reading process management unit that monitors and detects reading problems occurring in connection with the reading process, wherein the acquiring unit acquires said one of the problems from one of the printing process management unit and the reading process management unit.

4. The image reproducing apparatus according to claim 1, further comprising a use information retaining unit that retains use information about the image reproducing apparatus, wherein the communication unit reports the occurrence of said one of the problems, together with the use information, to the selected addressee.

5. The image reproducing apparatus according to claim 4, wherein the use information contains location information representing the location of the image reproducing apparatus.

6. The image reproducing apparatus according to claim 4, wherein the use information contains ID information for identifying the image reproducing apparatus.

7. The image reproducing apparatus according to claim 1, wherein the data storage stores one or more addressees as the addressee information, in association with said one of the problems.

8. The image reproducing apparatus according to claim 7, wherein the data storage stores at least one of a user of the image reproducing apparatus, a system administrator who conducts system administration for the image reproducing apparatus, and a maintenance person of the service center, in association with said one of the problems.

9. The image reproducing apparatus according to claim 1, wherein the data storage stores an e-mail address as the addressee information, in association with said one of the problems.

10. A method for monitoring and reporting problem occurring in connection with an image forming and reproducing process, the method comprising the steps of:
    storing a plurality of possible problems occurring in connection with the image forming and reproducing process in advance, each of the problems being stored in association with a problem ID code and addressee information selected based on a severity of the problem;
    detecting one of the problems having occurred in connection with the image forming and reproducing process;
    determining an addressee to which the occurrence of the detected problem is to be reported, from the addressee information stored in association with the detected problem;

reporting the detected problem to the determined addressee;

a web page creating means that creates a Web page containing detailed information about the problems detected in an image reporting and reproducing process and a user customizable designation corresponding to the image reproducing apparatus; and creating an e-mail to report the detected problem to the determined addressee, including inserting the problem ID code, the user customizable designation and a URL of the Web page in a subject field of the e-mail.

11. A problem monitoring apparatus connected to an image reproducing apparatus, comprising:

a data storage that stores a plurality of possible problems occurring in connection with an image forming and reproducing process carried out in the image reproducing apparatus, each of the problems being stored in association with a problem ID code and addressee information selected based on a severity of the problem;

an acquiring unit that receives and acquires problem information from the image reproducing apparatus when one of the problems occurs in the image reproducing apparatus;

an addressee determination unit that selects an addressee corresponding to said one of the problems with reference to the data storage;

a communication unit that reports occurrence of said one of the problems to the selected addressee;

a web page creating means that creates a Web page containing detailed information about the problems detected in an image reporting and reproducing process and a user customizable designation corresponding to the image reproducing apparatus; and e-mail creating means that creates an e-mail to report the occurrence of said one of the problems to the selected addressee and inserts the problem ID code, the user customizable designation and a URL of the Web page in a subject field of the e-mail.

12. An image reproducing apparatus comprising:

an image forming part that carries out an image forming and reproducing process;

a data storage that stores a plurality of possible problems occurring in connection with the image forming and reproducing process, each problem being stored in association with addressee information selected based on a severity of the problem;

an acquiring unit that acquires problem information when one of the problems occurs in connection with the image forming and reproducing process;

an addressee determination unit that selects an addressee corresponding to said one of the problems with reference to the data storage;

a communication unit that reports occurrence of said one of the problems to the selected addressee;

web page creating means that creates a Web page containing detailed information about the problems detected in the image reporting and reproducing process and a user customizable designation corresponding to the image reproducing apparatus; and an e-mail creating means that creates an e-mail to report the occurrence of said one of the problems to the selected addressee and inserts a problem ID code, the user customizable designation and a URL of the Web page in a subject field of the e-mail.

13. The image reproducing apparatus according to claim 12, wherein the forming and reproducing process includes at least one of a printing process for recording and outputting an image and a reading process for optically reading an original, and the image forming part includes at least one of a printing section that records and outputs the image, and a reading section that optically reads the original.

14. The image reproducing apparatus according to claim 13, further comprising a printing process management unit that monitors and detects printing problems occurring in connection with the printing process, and a reading process management unit that monitors and detects reading problems occurring in connection with the reading process, wherein the acquiring unit acquires said one of the problems from one of the printing process management unit and the reading process management unit.

15. The image reproducing apparatus according to claim 12, further comprising a use information retaining unit that retains use information about the image reproducing apparatus, wherein the communication unit reports the occurrence of said one of the problems, together with the use information, to the selected addressee.

16. The image reproducing apparatus according to claim 15, wherein the use information contains location information representing the location of the image reproducing apparatus.

17. The image reproducing apparatus according to claim 15, wherein the use information contains ID information for identifying the image reproducing apparatus.

18. The image reproducing apparatus according to claim 12, wherein the data storage stores one or more addressees as the addressee information, in association with said one of the problems.

19. The image reproducing apparatus according to claim 18, wherein the data storage stores at least one of a user of the image reproducing apparatus, a system administrator who conducts system administration for the image reproducing apparatus, and a maintenance person of the service center, in association with said one of the problems.

20. The image reproducing apparatus according to claim 12, wherein the data storage stores an e-mail address as the addressee information, in association with said one of the problems.

21. A method for monitoring and reporting problem occurring in connection with an image forming and reproducing process, the method comprising:

storing a plurality of possible problems occurring in connection with the image forming and reproducing process in advance, each of the problems being stored in association with addressee information selected based on a severity of the problem;

detecting one of the problems having occurred in connection with the image forming and reproducing process;

determining an addressee to which the occurrence of the detected problem is to be reported, from the addressee information stored in association with the detected problem;

reporting the detected problem to the determined addressee;

creating a Web page containing detailed information about the problems detected in the detecting and a user customizable designation corresponding to the image reproducing apparatus; and creating an e-mail to report the occurrence of said one of the problems to the selected addressee and inserts a problem ID code, the user customizable designation and a URL of the Web page in a subject field of the e-mail.

22. A problem monitoring apparatus connected to an image reproducing apparatus, comprising:
- a data storage that stores a plurality of possible problems occurring in connection with an image forming and reproducing process carried out in the image reproducing apparatus, each of the problems being stored in association with addressee information selected based on a severity of the problem;
- an acquiring unit that receives and acquires problem information from the image reproducing apparatus when one of the problems occurs in the image reproducing apparatus;
- an addressee determination unit that selects an addressee corresponding to said one of the problems with reference to the data storage;
- a communication unit that reports occurrence of said one of the problems to the selected addressee; and
- web page creating means that creates a Web page containing detailed information about the problems detected in the image reporting and reproducing process and a user customizable designation corresponding to the image reproducing apparatus; and
- creating an e-mail to report the occurrence of said one of the problems to the selected addressee and inserts a problem ID code, the user customizable designation and a URL of the Web page in a subject field of the e-mail.

* * * * *